Dec. 10, 1968         J. A. BARRINGER         3,415,467

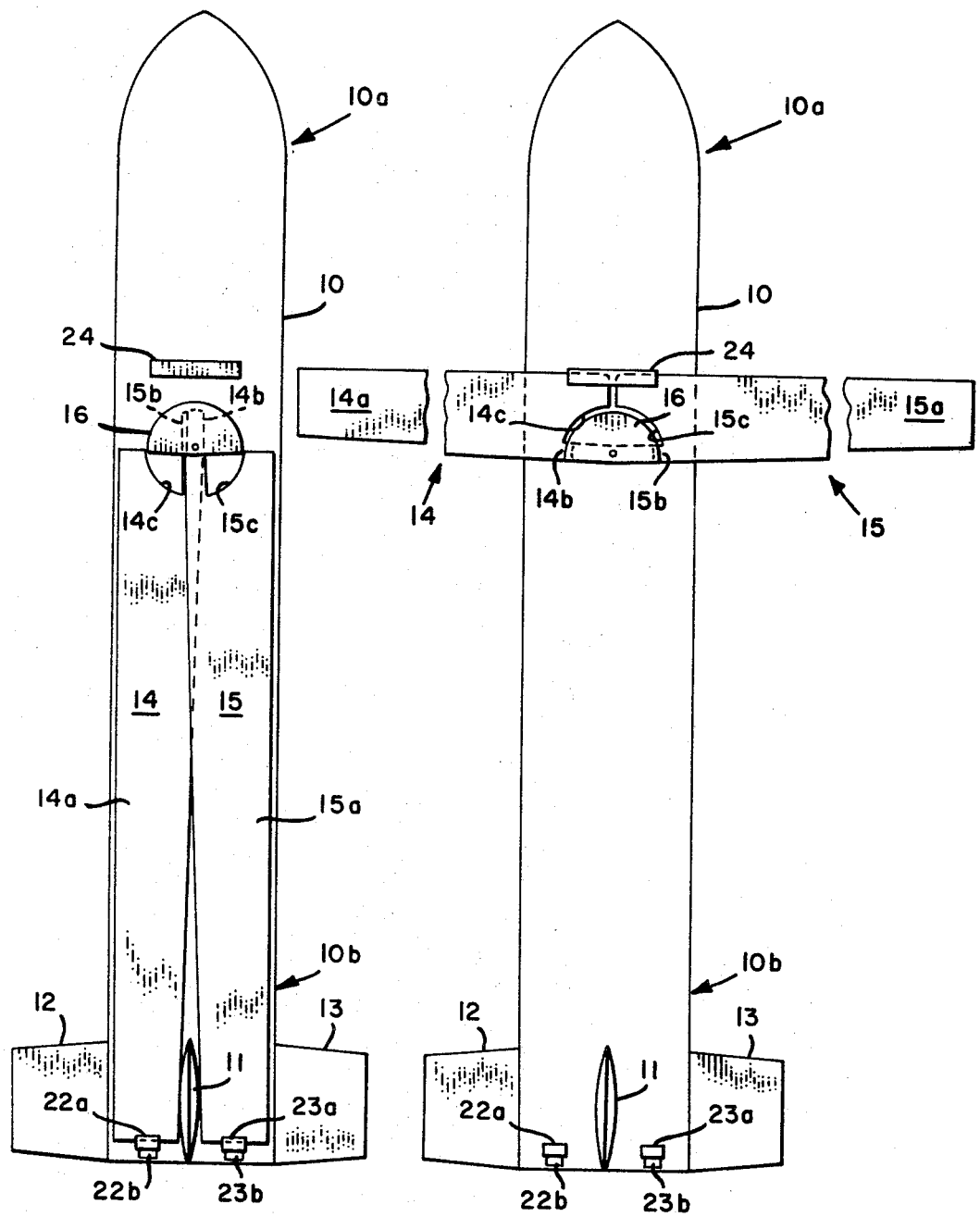

RETRIEVABLE ROCKET WITH FOLDED WINGS

Filed Jan. 30, 1967         4 Sheets-Sheet 2

INVENTOR.
JOSEPH A. BARRINGER

BY Robert Mednick

ATTORNEY

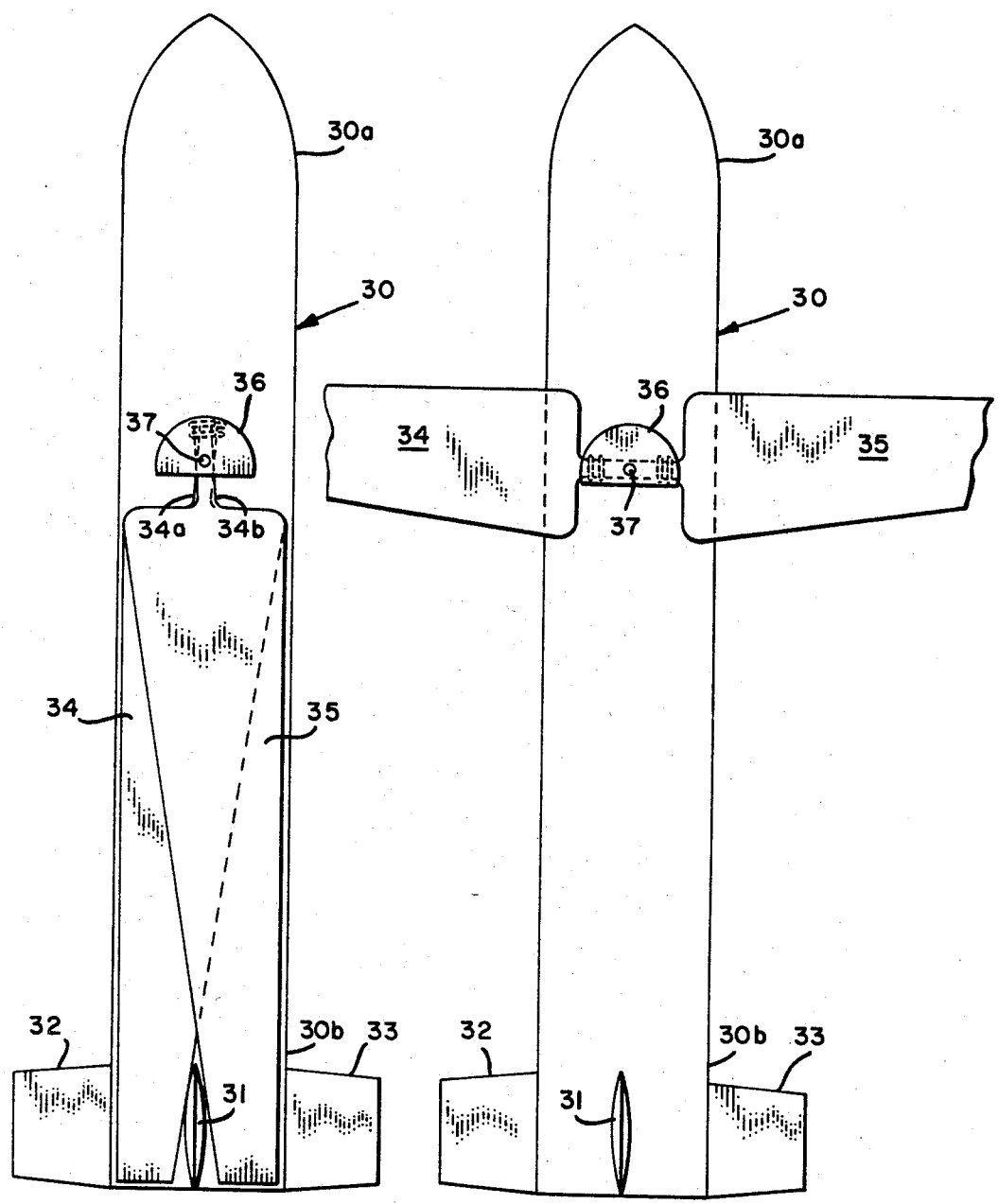

Dec. 10, 1968  J. A. BARRINGER  3,415,467
RETRIEVABLE ROCKET WITH FOLDED WINGS
Filed Jan. 30, 1967  4 Sheets-Sheet 4

INVENTOR.
JOSEPH A. BARRINGER
BY Robert Medwick
ATTORNEY

United States Patent Office 3,415,467
Patented Dec. 10, 1968

3,415,467
RETRIEVABLE ROCKET WITH FOLDED WINGS
Joseph A. Barringer, 525 E. Maude Ave.,
Sunnyvale, Calif. 94086
Filed Jan. 30, 1967, Ser. No. 612,711
8 Claims. (Cl. 244—3.29)

ABSTRACT OF THE DISCLOSURE

A retrievable rocket with folded wings that unfold to enable the rocket to slowly glide when descending, said rocket including a rocket body having a supportive casing with three spaced connected supporting members to form a pair of parallel slots, and said rocket including a pair of oppositely rotatable wings connected to pivot means within the supportive casing, each of said wings having a structural member that overlaps the structural member of the other wing and is supported by the supportive casing when the wings are unfolded.

---

The present invention relates to a rocket, and more particularly relates to a retrievable rocket with folded wings that unfold to enable the rocket to slowly glide when descending.

In the weather data field, a rocket may be caused to quickly ascend high in the atmosphere, and then allowed to descend back to earth at a relatively slow rate of speed. During its slow descent, instrumentation equipment on the rocket measures and records weather data information.

The present invention discloses a rocket having folded wings that unfold to laterally extend and be supported by air to enable the rocket to glide and slowly descend. The rocket of this invention has wings with longitudinal structural members that overlap in a supportive casing when the wings are in the gliding position to distribute and reduce the resulting loads.

It is therefore an object of this invention to provide a rocket with folded wings that unfold to become supportable in air.

Another object of this invention is to provide a rocket with wings that are easily supported and rotated in a supportive casing.

Still another object of this invention is to provide a rocket with folded wings having longitudinal structural members rotatable in a supportive casing to unfold the wings to a gliding position.

A further object of this invention is to provide a rocket with wings that are supported and rotated in a supportive casing in which the load forces of each wing when in gliding position partially counterbalance each other in order to reduce the effective load forces to be supported in the supportive casing.

A still further object of this invention is to provide a rocket with a supportive casing for foldable wings that is compact, sturdy, and of simple design, yet effective for supporting wing load forces when the rocket is caused to glide during descent.

The novel features which are believed to be characteristic of the invention, both as to its organization and method of operation, together with further objects and advantages thereof, will be better understood from the following description considered in connection with the accompanying drawings in which two embodiments of the invention are illustrated by way of examples. It is to be expressly understood, however, that the drawings are for the purpose of illustration and description only and are not intended as a definition of the limits of the invention.

FIG. 1 is a side view of one embodiment of the rocket of this invention showing the wings of the rocket folded along the side of the rocket body to enable rapid ascent thereof.

FIG. 2 is another side view of the rocket seen in FIG. 1, but showing its wings extending laterally to enable the rocket to act as a glider in descending back to earth.

FIG. 5 is a side view of another embodiment of the rocket of this invention showing the wings of the rocket folded along the side of the rocket body to enable rapid ascent thereof.

FIG. 6 is another side view of the rocket seen in FIG. 5, but showing its wings extending laterally to enable the rocket to act as a glider in descending back to earth.

Figure 3:
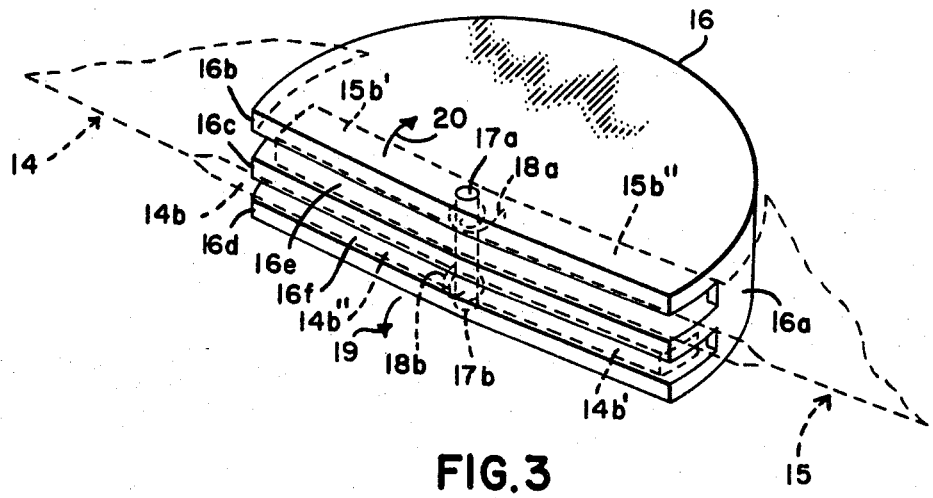
FIG. 3 is an enlarged perspective view of the supportive casing seen in FIGS. 1 and 2.

Referring now to the drawings, FIGS. 1 and 2 show a rocket having a fuselage or rocket body 10 with a nose portion 10a and a tail portion 10b. Nose portion 10a may contain various instruments (not shown) for measuring humidity, temperature, barometric pressure, time of flight, altitude, flight speed, etc., and for transmitting or recording such measurements. Tail portion 10b may contain rocket propulsion means (not shown) such as fuel storage apparatus, a rocket motor, and associated equipment, in order to provide the power means to enable the rocket to be propelled through the air. Rocket body 10 is seen to be provided with a rudder 11 and laterally extending stabilizers 12 and 13 for stabilizing and guiding the flight of the rocket. Rocket body 10 is preferably constructed of light material such as aluminum, plastic, or combinations thereof, suitable for such use.

Rocket body 10 is seen to have a pair of wings 14 and 15 connected to supportive casing 16. Wings 14 and 15 include wing members 14a and 15a which provide broad surface for aerodynamically supporting the rocket during descent. Wing members 14a and 15a are able to resist the fall of the rocket during its descent to enable it to glide and thereby return slowly to earth. Wings 14 and 15 also include longitudinal structural members or wing spars 14b and 15b which are connected to wing members 14a and 15a and extend therefrom to be supported by supportive casing 16.

Referring now also to FIG. 3, supportive casing 16 is seen to have a semi-circular wall 16a with three parallel supporting members 16b, 16c, and 16d, extending laterally therefrom. Supporting members 16b, 16c, and 16d are seen to be equally spaced from each other and form a pair of parallel slots 16e and 16f.

A first pin 17a in slot 16e is fixedly connected to supporting members 16b and 16c half way between the ends of semi-circular wall 16a and near the edges of said supporting members as seen in the figures. A spring 18a connects to pin 17a and to supporting member 16b to spring load pin 17a and urge it to rotate in a counterclockwise direction indicated by arrow 19 as seen in FIG. 3. A second pin 17b in slot 16f is fixedly connected to supporting members 16c and 16d, and is aligned with said first pin 17a. A spring 18b connects to pin 17b and to supporting member 16d to spring load pin 17b and urge it to rotate in a clockwise direction indicated by arrow 20 seen in FIG. 3. Pins 17a and 17b are the pivot means and springs 18a and 18b are the drivers for wings 14 and 15 respectively, that enable wings 14 and 15 to be turned as hereinafter described.

First pin 17a fits within a pin hole in wing spar 15b to allow wing 15 to rotate about pin 17a. End portion 15b' of wing spar 15b extends within slot 16e towards wall 16a.

On the opposite side of pin 17a, intermediate portion 15b" of wing spar 15b extends within slot 16e when wing 15 is unfolded as seen in FIG. 2. End portion 15b' and intermediate portion 15b" of wing spar 15b are both within slot 16e of supportive casing 16 when wing 15 is unfolded. Similarly, second pin 17b fits within a pin hole in wing spar 14b to allow wing 14 to rotate about pin 17b. End portion 14b' of wing spar 14b extends within slot 16f towards wall 16a. On the opposite side of pin 17b, intermediate portion 14b" of wing spar 14b extends within slot 16f when wing 14 is unfolded as seen in FIG. 2. End portion 14b' and intermediate portion 14b" of wing spar 14 are both within slot 16f of supportive casing 16 when wing 14 is unfolded. A part of wing spars 14b and 15b are seen as dotted lines in FIG. 3. As seen in FIG. 3, end portion 15b' of wing 15 overlaps intermediate portion 14b" of wing 14, and end portion 14b' of wing 14 overlaps intermediate portion 15b" of wing 15.

On one side of rudder 11, a holding member 22a is seen for holding wing 14 in its folded position of FIG. 1. Holding member 22a may comprise a short U-shaped channel which is spring loaded to normally bear against the end of wing member 14 and thereby restrain it from moving. A releasing solenoid 22b is also provided for pulling holding member 22a away from wing member 14 to be free thereof and allow it to move. Another identical holding member 23a and releasing solenoid 23b are also provided for wing 15. Furthermore, a common brace 24 is attached to rocket body 10 in between supportive casing 16 and the nose section 10a of the rocket. Brace 24 is a channel member which is positioned to receive and hold the edges of wings 14 and 15 when unfolded as seen in FIG. 2. Wing members 14a and 15a are seen to have curved shoulders 14c and 15c respectively, in order to clear supportive casing 16 when moved from the folded position of FIG. 1 to extend laterally from rocket body 10 to the unfolded position of FIG. 2.

In operation, prior to firing the rocket, wings 14 and 15 are folded along the side of rocket body 10 against the force of spring loaded pins 17b and 17a. Holding members 22a and 22b are caused to fit around the edges of wings 14 and 15 and hold them in the folded position. Now, the rocket may be fired and caused to ascend to a desired height. Upon descending, it is now desired to extend the wings laterally in order for the rocket to slowly glide to prevent its destruction if freely falling back to earth. At the desired time, an actuating voltage is developed for energizing solenoids 22b and 23b to enable them to release holding members 22a and 23a. For example, the occurrence of the actuating voltage may be caused to be dependent upon altitude attained or flight time elapsed. In either event, one of the various instruments contained in the rocket may be used to develop such an actuating signal and then apply it to solenoids 22b and 23b.

When holding members 22a and 22b are released, wings 14 and 15 will thereupon rotate in opposite directions because of the biasing forces presented by springs 18b and 18a connected to pins 17b and 17a, respectively. Wings 14 and 15 will then laterally extend from rocket body 10 to be unfolded as seen in FIG. 2, and channel 24 will receive the edges of wings 14 and 15 to additionally support them. Wings 14 and 15 will then remain unfolded until the rocket glides back to earth and is retrieved to be subsequently refired. It is during such descent that end portion 15b' of wing 15 overalps intermediate portion 14b" of wing 14, and that end portion 14b' of wing 14 overlaps intermediate portion 15b" of wing 15.

Figure 4:
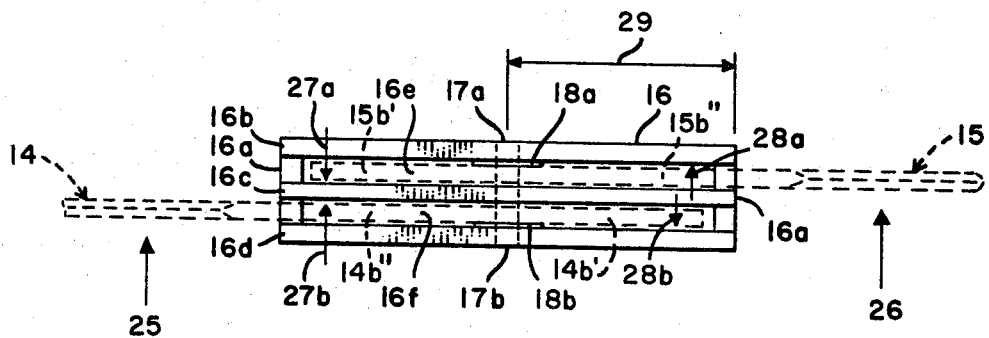
FIG. 4 is a front view of the supportive casing seen in FIG. 3 and illustrates the forces applied to said casing when the rocket is gliding.

Referring now to FIG. 4, a front view of supportive casing 16 is therein seen with a schematic showing of the forces applied to said casing when the rocket is gliding back to earth. During descent, air resistance causes a restraining or lifting force on the broad surfaces of wing members 14 and 15 which are represented by arrows 25 and 26. To counteract force 26 on wing 15, end portion 15b' presses against supporting member 16c with force 27a and intermediate portion 15b" presses against supporting member 16b with force 28a. Similarly, to counteract force 25 on wing 14, end portion 14b' presses against supporting member 16d with force 28b and intermediate portion 14b" presses against supporting member 16c with force 27b. For substantially equal forces 25 and 26 applied to wings 14 and 15, it will be realized that forces 27a and 27b will be similarly substantially equal, and will counterbalance each other. Accordingly, the reacting forces to be supported by supportive casing 16 are thereby reduced. In addition, the other forces 28a and 28b are not directed at pins 17a and 17b where the leverage distance is very small, but they are supported at a greater distance such as 29 from the center of pin 17a, thereby longer leverage advantage is obtained than if supported at pins 17a and 17b. Also, since forces 28a and 28b are at distance 29 from the center of pin 17a in supportive casing 16, these forces are thereby directed close to wall 16a to be in turn supported thereby. As a result, the supportive casing utilized in this invention is of relatively simple design and effective for supporting wing load forces.

Figure 7:
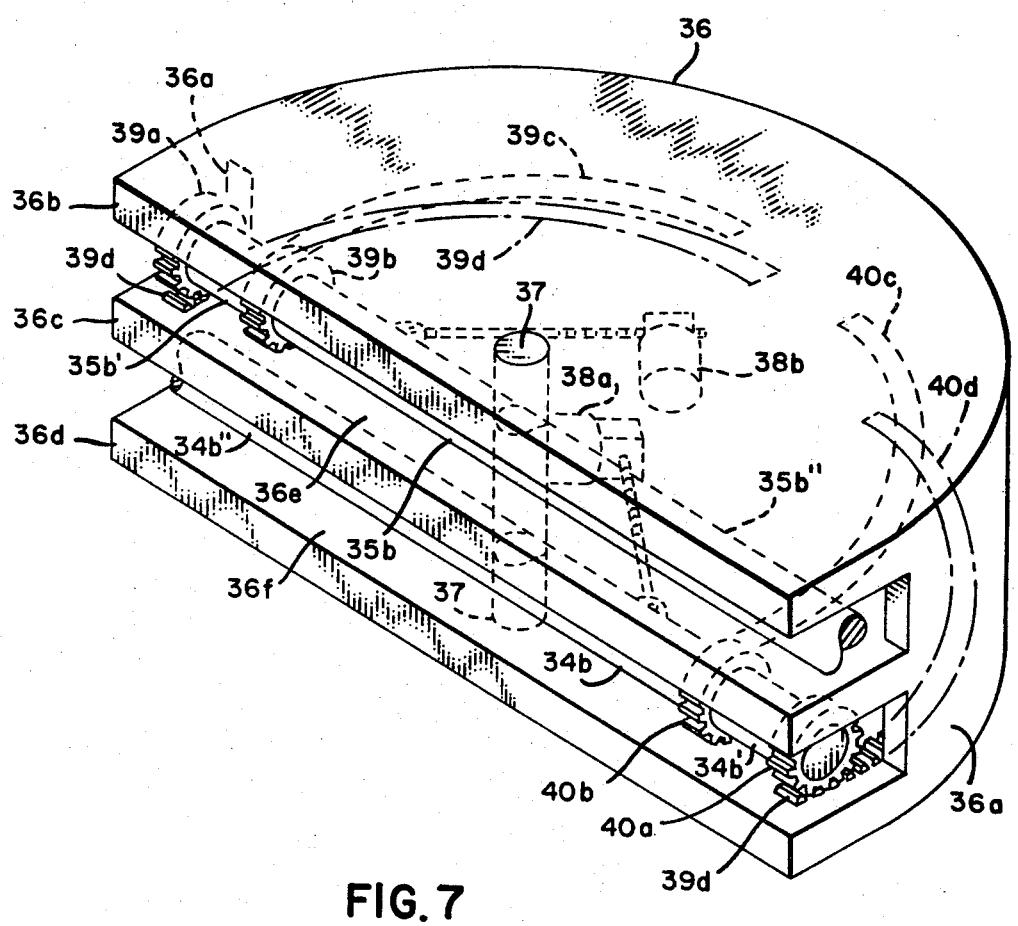
FIG. 7 is an enlarged perspective view of the supportive casing seen in FIGS. 5 and 6.

The previously described embodiment is suitable for a very small rocket utilized for measuring and recording weather data information. For larger rockets, heavier wings are needed, and as a result a positive drive rather than spring means is desired for unfolding the wings. Such a positive drive may comprise an hydraulic system or an electric motor. FIGS. 5, 6, and 7 are views of another embodiment of this invention similar to the views seen in FIGS. 1, 2, and 3 respectively. However, in FIGS. 5, 6, and 7 there is shown a rocket with modified wings held by supportive casing that includes electric motors as drivers for unfolding the wings.

The rocket seen in FIGS. 5 and 6 include a rocket body 30 with a nose portion 30a and a tail portion 30b, a rudder 31, and stabilizers 32 and 33 similar to those of the rocket seen in FIGURES 1 and 2. A supportive casing 36 with a wall 36a and three parallel supporting members 36b, 36c, and 36d is also connected to rocket body 30. Wings 34 and 35 have spars 34b and 35b, respectively, centrally extending therefrom, and which are held by a pin 37 extending through supporting member 36c and being fixedly connected to supporting members 36b, 36c, and 36d. Pin 37 is the pivot means in this embodiment.

As also seen in FIG. 7, a driver for each of said wings 34 and 35 comprise electric motors 38a and 38b fitted within slots 36f and 36e and connected by suitable links to move wings 34 and 35 respectively from the folded position of FIG. 5 to the unfolded position of FIG. 6. End portion 35b' of spar 35b has freely rotatable gears 39a and 39b for moving on and be guided by gear tracks 39c and 39d on supporting members 36b and 36b, respectively. Similarly, end portion 34b' has freely rotatable gears 40a and 40b for moving on and to be guided by gear tracks 40c and 40d on supporting members 36d and 36c respectively.

In operation, this embodiment differs only from the previously described embodiment of this invention because of the provision of a different driving arrangement. In this latter embodiment, the developed actuating signal will be utilized to turn on motors 38a and 38b to move wings 34 and 35 to extend laterally as seen in FIG. 6. During descent, end portion 35b' of wing spar 35 in between support member 36b and 36c will overlap intermediate portion 34b" of wing spar 34b in between support members 36c and 36d; also, end portion 34b' of wing spar 34b in between support member 36c and 36d will overlap intermediate portion 35b" of wing spar 35 in between support members 36b and 36c. As a result, supportive casing 36 will be as effective as that previously described for supporting the wing load forces during descent of the rocket.

Having herein described the invention, what is claimed as new is:

1. A rocket comprising:
   a rocket body;
   a supportive casing connected to said rocket body, said supportive casing having three spaced connected supporting members to form a pair of parallel slots;
   a pivot means within each of said slots and being connected to the supporting members;
   a driver within each of said slots and being connected to the supporting members; and
   a pair of wings, each wing having a longitudinal structural member with an end portion and an intermediate portion, each structural member being connected to one of said pivot means with its intermediate portion on one side of said pivot means and with its end portion extending within one of said slots on the other side of said pivot means, the longitudinal structure members being connected to the drivers to be rotated in opposite directions to move the wings from a folded position along the side of the rocket body to a gliding position extending laterally from the side of the rocket body, and the end portions of each longitudinal structural member overlap the intermediate portion of the other longitudinal structural member when the wings are in said gliding position.

2. A rocket comprising:
   a rocket body;
   a supportive casing connected to said rocket body, said supportive casing having three spaced connected supporting members to form a pair of parallel slots;
   a pivot means and a driver within each of said slots and being connected to the supportig members; and
   a pair of wings, each wing having a longitudinal structural member with an end portion and an intermediate portion, each structural member being connected to said pivot means with its intermediate portion on one side of said pivot means and with its end portion extending within one of said slots on the other side of said pivot means, the longitudinal structural members being connected to the drivers to be rotated in opposite directions to move the wings from a folded position along the side of the rocket body to a gliding position extending laterally from the side of the rocket body, the end portion and intermediate portion of each longitudinal structural member being within a slot and being supported by adjoining supporting members when the wings are in said gliding position, and the end portions of each longitudinal structural member overlap the intermediate portion of the other longitudinal structural member when the wings are in said gliding position.

3. The rocket defined in claim 1 which additionally includes releasable holding means secured to said rocket body and positioned to hold the wings in folded position during ascent of the rocket, and a brace secured to said rocket body and positioned to receive and support the wings when unfolded during descent of the rocket.

4. The rocket defined in claim 2 which additionally includes releasable holding means secured to said rocket body and positioned to hold the wings in folded position during ascent of the rocket, and a brace secured to said rocket body and positioned to receive and support the wings when unfolded during descent of the rocket.

5. A rocket comprising.
   a rocket body;
   a supportive casing connected to said rocket body, said supportive casing having three spaced connected supporting members to form a pair of parallel slots;
   a pivot means within said slots and being connected to the supporting members; and
   a pair of wings, each wing having a longitudinal structural member with an end portion and an intermediate portion, each structural member being connected to said pivot means with iits intermediate portion on one side of said pivot means and with its end portion extending within one of said slots on the other side of said pivot means, the longitudinal structure members being rotatable in opposite directions to move the wings from a folded position along the side of the rocket body to a gliding position extending laterally from the side of the rocket body, the end portions of each longitudinal structural member overlap the intermediate portion of the other longitudinal structural member when the wings are in said gliding position.

6. The rocket defined in claim 5 which additionally includes a releasable holding means secured to said rocket body and positioned to hold the wings in folded position during ascent of the rocket, and a brace secured to said rocket body and positioned to receive and support the wings when unfolded during descent of the rocket.

7. The rocket defined in claim 5 which additionally includes a motor within each of said slots, and wherein said supporting members of the supportive casing have gear tracks, said end portions of each wing have gears engaging the gear tracks, and each of said motors are connected to each of said end portions to move the wings from the folded to the unfolded positions.

8. A rocket comprising:
   a rocket body;
   a supportive casing connected to said rocket body, said supportive casing having a semi-circular wall and three spaced supporting members extending from said wall to form a pair of parallel slots;
   a pivot means connected to the supportive casing;
   a driver within each of said slots and being connected to the supporting members; and
   a pair of wings, each wing having a longitudinal structural member with an end portion and an intermediate portion, each structural member being connected to said pivot means with its intermediate portion on one side of said pivot means and with its end portion extending within one of said slots on the other side of said pivot means, the longitudinal structural members being connected to the drivers to be rotated in opposite directions to move the wings from a folded position along the side of the rocket body to a gliding position extending laterally from the side of the rocket body, the end portion and intermediate portion of each longitudinal structural member being within a slot and being supported by adjoining supporting members when the wings are in said gliding position, and the end portions of each longitudinal structural member overlap the intermediate portion of the other longitudinal structural member when the wings are in said gliding position.

References Cited

UNITED STATES PATENTS

| | | | |
|---|---|---|---|
| 1,888,418 | 11/1932 | Adams | 244—43 |
| 2,365,577 | 12/1944 | Moore | 244—3.28 |
| 3,194,514 | 7/1965 | Rogallo | 244—49 |

FOREIGN PATENTS 256,743   8/1926   Great Britain.

VERLIN R. PENDEGRASS, *Primary Examiner.*